United States Patent [19]

Spanek, Jr.

[11] Patent Number: 5,114,044
[45] Date of Patent: May 19, 1992

[54] MULTIPLE SLEEVE PASTRY TUBE

[76] Inventor: George Spanek, Jr., 212 Eaton Rd. #32, San Mateo, Calif. 94402

[21] Appl. No.: 538,399

[22] Filed: Jun. 15, 1990

[51] Int. Cl.⁵ .............................................. B65D 35/22
[52] U.S. Cl. .................................... 222/94; 222/568; 222/575; 383/906
[58] Field of Search ............... 222/566, 567, 568, 575, 222/94, 137; 383/37, 38, 63, 906

[56] References Cited

U.S. PATENT DOCUMENTS

| | | | |
|---|---|---|---|
| 2,711,269 | 6/1955 | Snaith | 222/94 |
| 3,191,809 | 6/1965 | Schultz et al. | 222/567 |
| 3,323,682 | 6/1967 | Creighton et al. | 222/137 |
| 3,847,523 | 11/1974 | Parrish et al. | 222/568 |
| 4,261,481 | 4/1981 | Speer | 222/145 |
| 4,574,987 | 3/1986 | Halligan et al. | 222/94 |
| 4,796,300 | 1/1989 | Branson | 383/63 |
| 4,961,517 | 10/1990 | Tkac | 222/94 |
| 4,978,336 | 12/1990 | Capozzi et al. | 222/137 |
| 5,026,194 | 6/1991 | Lewis | 222/567 |

FOREIGN PATENT DOCUMENTS 731937  9/1932  France .................. 222/94

Primary Examiner—Michael S. Huppert
Assistant Examiner—Gregory L. Huson
Attorney, Agent, or Firm—Julian Caplan

[57] ABSTRACT

Two or more plastic or fabric pastry tubes of the general type used by chefs for decorating pastry with icing or other materials or dispensing pureed vegetables or the like are each provided with separate nozzles which are semi-circular in cross section when two tubes are used and appropriately shaped when more than two are used. The nozzles are held together while the tubes are squeezed, thereby dispensing plural colored ribbons of icing or vegetables in closely adjacent designs. The nozzles may be held assembled by a ring. In one modification, spouts fit in the lower ends of the tubes and project therefrom as semi-cylindrical externally threaded projects held together. A first nut secures the tubes to their respective spouts. A second nut secures a pair of nozzles to their respective spouts. The upper ends of the tubes may be detachably held together by Velcro-like patches. The tubes are preferably of the conventional conical shape and may be disposable or reusable. A zip-lock type closure may be used to close off the upper ends of the tubes. Various size and shape nozzles may be used for preferred ribbon configurations.

15 Claims, 4 Drawing Sheets

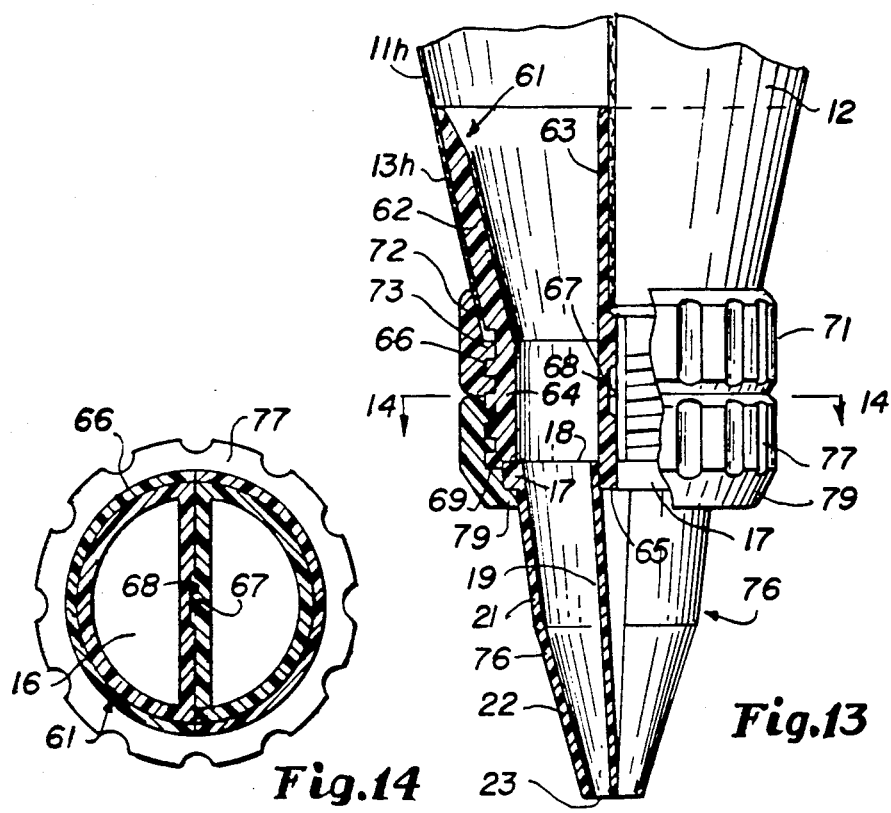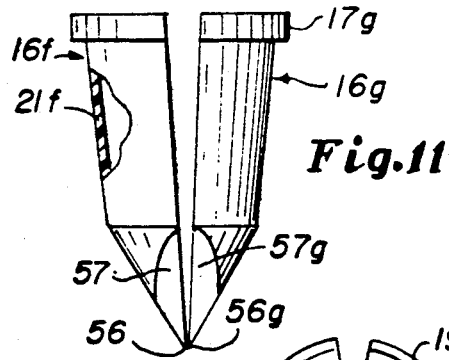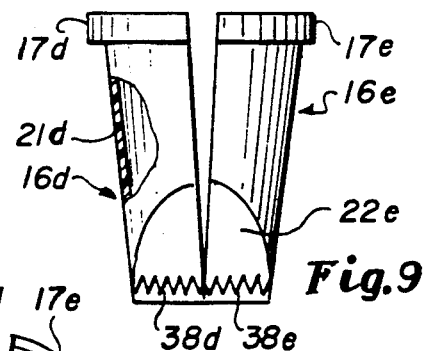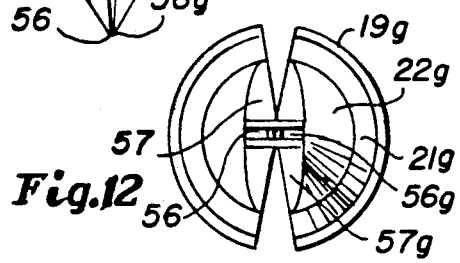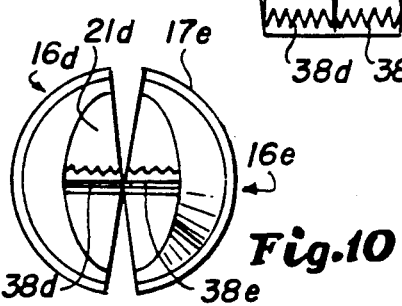

MULTIPLE SLEEVE PASTRY TUBE

BACKGROUND OF THE INVENTION

1. Field of the Invention

This invention relates to a new and improved multiple sleeve pastry tube whereby one or more ribbons of icing, pureed vegetables, or other decorative materials may be applied to pastry, to plates and platters and the like. Preferably two different colors are dispensed so that a unique multi-colored effect is accomplished with relatively little skill or effort.

2. Prior Art

Pastry tubes have been used by chefs for many years, being generally made of cloth or various kinds of plastics. Interchangeable nozzles have been inserted in the bottoms of the tubes to dispense the contents as the sleeve is squeezed. The nozzles are in various shapes and sizes and are selected by the user to accomplish the artistic decorative effect desired. The present invention differs in that two separate tubes each equipped with an interchangeable nozzle are employed, filled with different materials so that when the two tubes are squeezed simultaneously, two closely adjacent ribbons are discharged simultaneously.

SUMMARY OF THE INVENTION

The present invention is distinguished in that two or more separate tubes are employed, each tube having an individual interchangeable nozzle. The nozzles and tubes are held side by side so that the apertures of the nozzles are in close proximity. By squeezing the contents of both tubes simultaneously, two ribbons are discharged, one from each tube. Typical examples of use of the invention are to dispense two (or more) colors of icing for decorating pastry. Another typical example is to dispense two different pureed vegetables to decorate a plate or platter, e.g., carrots and potatoes.

Nozzles of various shapes and sizes are employed, the nozzles being interchangeable but the nozzles are so shaped that they fit close together. For example, if two tubes are employed, the nozzles may be semi-circular in cross section. However it will be understood that rectangular nozzles or those which are serrated or star shaped along the edges may be employed. Nozzles of different widths may be used, all depending on the artistic effect which the user wishes to achieve. Frequently greetings and messages are used in decorating cakes. Use for this purpose in the present invention is accomplished by extending the nozzles so that they are quite small at their discharge ends. It will further be understood that one nozzle may be of one style or shape and the other of a different style or shape.

Another feature of the invention is the fact that the nozzles may be held assembled by slipping a ring or other means over the same.

In one modification of the invention, fittings or spouts are installed in the ends of the fabric or plastic tubes, each fitting being flared to fit into the bottom of the tube and having external threads. A first nut secures the lower end of the tube to the fitting and also secures the fittings together. Nozzles of the type heretofore described may then be installed on the lower ends of the fittings and a second nut threaded over the external threads of the fittings to hold the nozzles in place. This version of the invention provides a rapid means of accommodating two conventional pastry tubes to dispense two different ingredients with the dispensing nozzles being in close proximity. Where desired, instead of using plural nozzles, a single nozzle may be used and the contents of both tubes dispensed simultaneously through the single nozzle.

The pastry tubes may be of any conventional style and are generally of a conical shape made of cloth or clear or opaque plastic. Disposable tubes are sometimes used in the cake decorating art and these may be employed in accordance with the present invention along with reusable nozzles. It will further be understood that many pastry tubes are sold to accommodate small nozzles but by cutting off the end of the tube, larger nozzles may be inserted. The present invention envisions use of either type of sleeve.

Another feature of the invention is the provision of a closure at the upper or large end of the tube to permit storage between uses. Preferably a ZIPLOCK type fastener is used to close the upper end of the tube.

Additionally, since the tubes are held in side by side fashion when being dispensed, means may be employed to hold the two tubes together. A preferred means is to place a VELCRO-like fastener strip of one type on one tube and the opposite type VELCRO-like fastener strip on the other. By contacting the two strips, the sleeves may be held in proximity.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 is a side elevational view showing assembly of two nozzles of similar shape.

FIG. 10 is a bottom plan view of the structure of FIG. 9.

FIG. 11 is a view similar to FIG. 9 of a further modification.

FIG. 12 is a bottom plan view of the structure of FIG. 11.

FIG. 13 is an enlarged fragmentary side elevational view of a further modification partly broken away in section to reveal internal construction.

FIG. 14 is a sectional view taken substantially along the line 14—14 of FIG. 13.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Pastry tubes 11 and 12 may be of commercially available types. Those shown in FIGS. 1 and 2 of the accompanying drawings are somewhat more complicated than those conventionally used. Each tube has a narrow lower end 13 dimensioned for use with a particular nozzle 16 which is usually inserted through the wide upper end 14 before the contents of the tube are loaded. As commercially available, such tubes are usually sold with a relatively narrow end 13 and if a larger nozzle 16 is to be used, the end 13 is shortened using a scissors or other implement.

Figure 1:
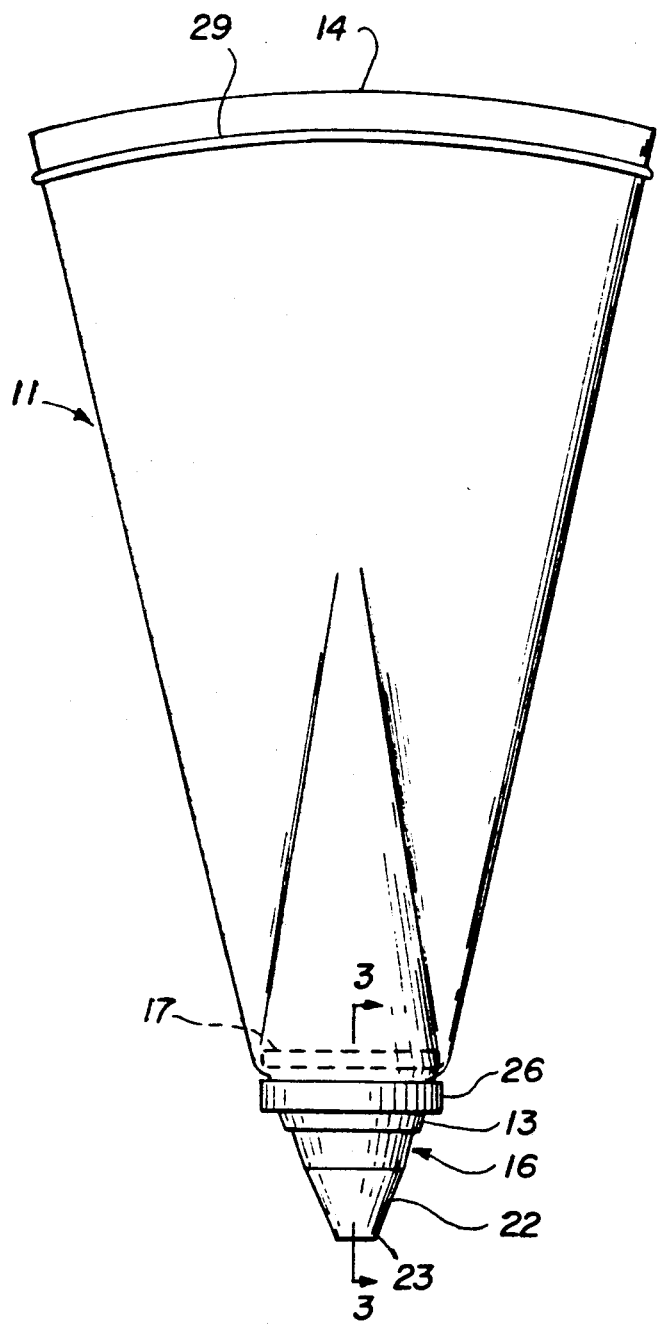
FIG. 1 is a side elevational view of a pastry tube and nozzle in accordance with the present invention.
Figure 2:
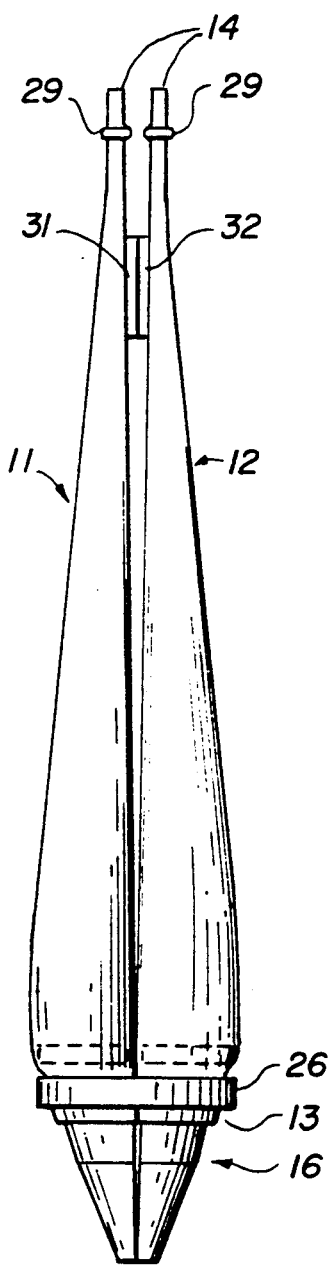
FIG. 2 is an end elevation showing two tubes and nozzles assembled.
Figure 3:
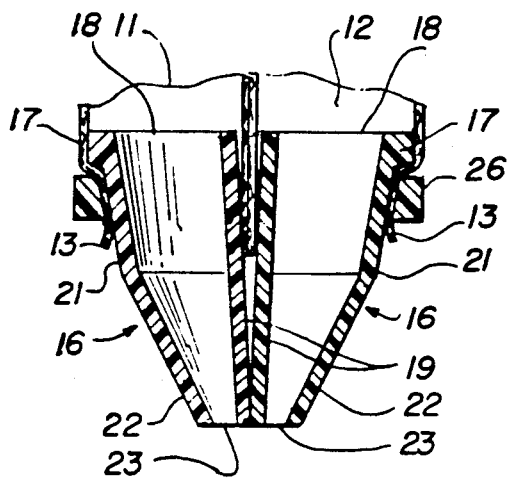
FIG. 3 is a sectional view taken substantially along the line 3—3 of FIG. 1.

Likewise the nozzles 16 here shown are somewhat more complicated than those conventionally used with pastry tubes. Thus optionally a flange 17 may be formed surrounding the upper end 18. On one side each nozzle 16 is formed with a tapered flat wall 19 so that a pair of nozzles 16 may be held in close proximity to each other with the walls 19 abutting. Downward tapered generally semi-circular cross section walls 21 curve around from the opposite edges 30 of walls 19. As shown in FIGS. 1-3, at their lower ends curved walls 21 merge with lower tapered walls 22 which are likewise conical but at a more acute angle with respect to the axis of the cone. At the bottom of the nozzle 16 is an aperture 23 through which the contents of the tube 11 or 12 is dispensed. As has heretofore been mentioned, the size and shape of aperture 23 is subject to wide modification. In the particular form of invention as best shown in FIG. 3, a ring 26 is slipped upward from the bottom ends of the nozzles to adjacent the flanges 17 thereby holding the walls 19 of the two nozzles substantially abutting and locating the apertures 23 of the two nozzles in close proximity.

Other optional features of the invention shown in FIGS. 1 and 2 comprise a ZIPLOCK type fastener 29 which closes off the upper end 14 after the tube has been loaded and VELCRO like strips 31,32 attached to the nozzles 11 and 12 respectively which may be pressed together to hold the tubes assembled in proximity to facilitate the user grasping both tubes and squeezing the contents simultaneously.

Figure 4:
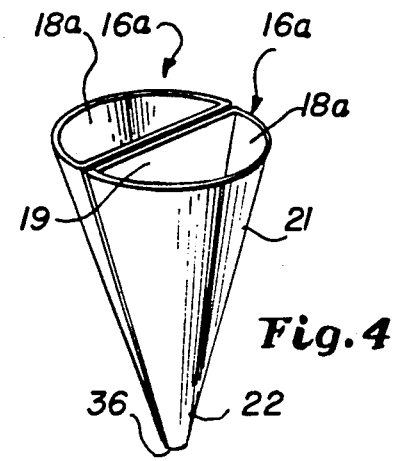
FIG. 4 is a perspective view of a pair of modified nozzles.

FIG. 4 shows a modification of the structure of the nozzles of the preceding modification characterized by the fact that there is no flange at the upper end 18a thereof and further characterized in that the side walls 21 taper straight downward and the aperture 36 is quite small. The fine stream of icing which is emitted therefrom may be used to write messages and greetings on cakes and for other purposes.

Figure 5:
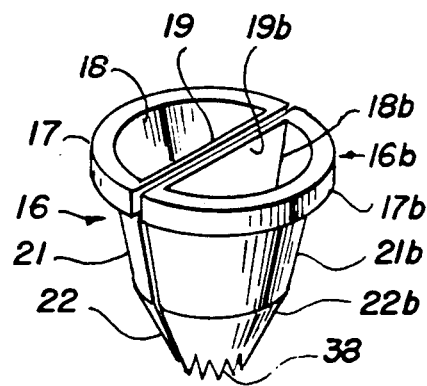
FIG. 5 is a perspective view of a still further modified pair of nozzles.
Figure 6:
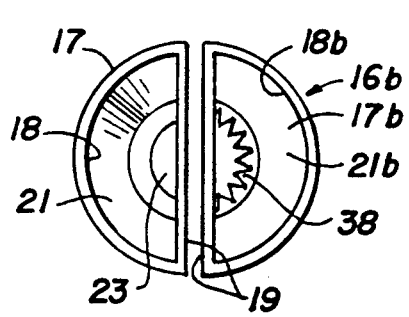
FIG. 6 is a top plan view of the structure of FIG. 5.

FIGS. 5 and 6 show a modification of the structure of FIGS. 1-3 in that the nozzle 16b has a different shaped aperture 38. This modification shows that the two nozzles may have different shaped apertures—semi-circular in the case of nozzle 16 and serrated or star shaped in nozzle 16b.

Figure 7:
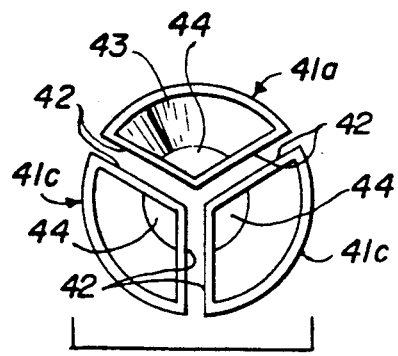
FIGS. 7 and 8 are exploded top plan views of two further modifications of the invention.

FIG. 7 shows one form of the invention wherein there are three sector cross section shaped nozzles 41a, b, c. Each sector has a pair of flat radial walls 42 diverging at an angle of approximately 120° and an outer arcuate wall 43. Thus the apertures 44 are correspondingly sector shaped. It will be understood that more than three separate nozzles may be used if required.

Figure 8:
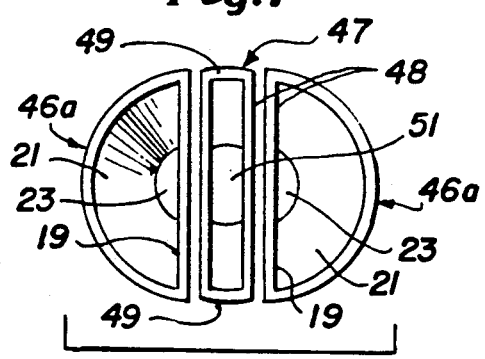

FIG. 8 shows still a different means for dispensing the contents of three tubes. Nozzles 46a,b are semi-circular and resemble those shown in FIGS. 1-3. The center nozzle 47 preferably has parallel flat sides 48 which match the flat walls 19 of nozzles 46a,b and arcuate ends 49 which converge downwardly as do the walls 21 of nozzle segments 46a,b. The aperture 51 of center nozzle 47 is substantially rectangular with slightly curved opposed ends.

FIG. 9 is a side elevational view showing the position of two semi-conical nozzles assembled, characterized in that both nozzles 38d, 38e have dispensing apertures of similar shape. The modification of FIG. 11 is similar to FIG. 9 except that two very fine apertures are formed in the nozzles shown therein. For such purpose, curved cut-outs 57, 57g are formed in the lower ends of the conical portions of the nozzles 16f, 16g, respectively, resulting in very fine writing tip points 56 suitable for inscribing greetings and names on a cake, for example.

The modification of FIGS. 13-14 is of particular use in commercial bakeries and in other instances where frequent use of pastry tubes is made. Disposed in the lower end of the tubes 11h and 11j are spouts 61. The upper end of each spout 61 has a flared, semi-circular end 62 which fits inside the lower end 13h of the tube 11h, or 11j. Central wall 63 is diametric and fits in proximity to the corresponding wall of the opposite spout. The lower end of wall 63 forms a separator 65. Below the flared end 62 is a cylindrical portion 64 formed with external threads 66. To facilitate proper alignment of the spouts 61 for the two tubes being used, one of the central walls 63 is formed with a boss 67 and the opposite central wall is formed with a complementary socket 68. When the tubes are assembled with the spouts 61 in proximity as shown in FIG. 13, the boss 67 fits into the socket 68 and aligns the parts in place. Accordingly, upper nut 71 may be threaded over the threads 66 to lock the tubes and spouts in position. The upper end of nut 71 is formed with a conical portion 72 which engages the lower narrow end 13h of the tube 11h and locks it in place. The lower or cylindrical portion of nut 71 is formed with internal threads 73 which mate with the threads 66.

Nozzles 76 similar in construction but preferably longer than nozzles 16 are used. The upper end of nozzle 76 has an external flange 17 which fits against shoulder 69 on the bottom of spout 61. Lower nut 77 is slipped upward over the nozzle 76 and its upper cylindrical end is formed with internal threads 78 which engage threads 66. The lower end of nut 77 is formed with an internal flange 79 which engages under the flange 17 of the nozzle 76 and secures it against the shoulder 69 on the lower end of spout 61. In use, after the parts are assembled as shown in FIGS. 13 and 14, either the same or different ingredients in the tubes 11h, 11j may be dispensed through the duplicate nozzles 76.

Figure 15:
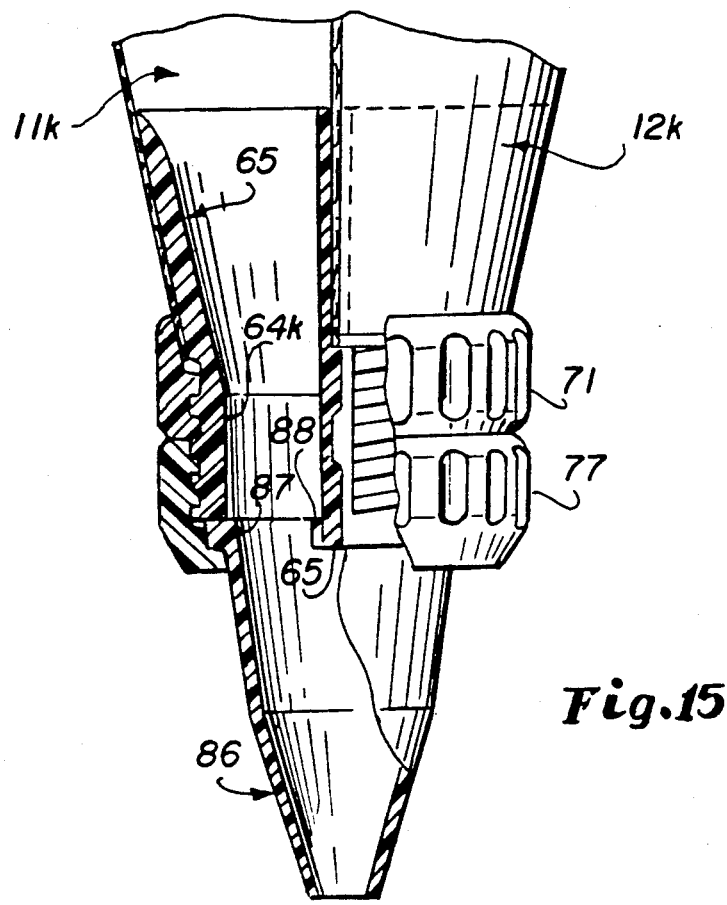
FIG. 15 is a view similar to FIG. 13 showing the structure thereof used to dispense through a single nozzle.
Figure 16:
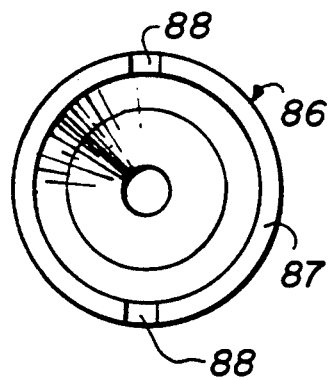
FIG. 16 is a top plan view of the nozzle of FIG. 15.

FIGS. 15-16 show a modification of the structure of FIGS. 13-14 in that occasionally it may be desired to use a single dispensing nozzle 86 instead of two nozzles. In this modification, for example, the same ingredients may be placed both in the tube 11h and 12, thereby doubling the capacity of a single tube. Alternatively, each tube may have a different color ingredient resulting in a variegated ribbon being dispensed from the single nozzle 86. To accommodate the separator 65, notches 88 are formed in the flange 87. In other respects the nozzle 86 of FIGS. 15-16 may be installed in the same manner as in the preceding modification.

The various elements of modified forms of the invention shown in FIGS. 4, 5-6, 7, 9-10, 11-12, and 13-14, in many respects resemble those of the preceding modifications and the same reference numerals followed by the subscripts a, b, c-d, f-g and h are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. In combination a first pastry tube, a second pastry tube, each said tube having an enlarged upper end and a restricted lower end;

a first nozzle and a second nozzle, each said nozzle being downwardly tapering and having an enlarged upper end and a restricted lower end formed with a dispensing aperture, each said nozzle having a flat wall and an arcuate wall extending from a first edge of said flat wall around to a second edge of said flat wall opposite said first edge, nozzle securing means detachably connecting each said nozzle to the lower end of one said tube with said nozzles projecting out from said lower ends of said tubes, and said first and second tubes being side by side and said first and second nozzles being side by side with their flat walls abutting whereby when said tubes are squeezed, ribbons of the contents of both tubes are dispensed through said apertures in close proximity, said nozzle securing means comprising for each said tube a spout having a flared under portion located inside said tube and a lower spout portion, detachable means for securing said lower spout portion to at least one said nozzle, said nozzles converging distally, and which further comprises second means for securing said flared portion to the lower end of at least one said tube.

2. The combination of claim 1 in which both said nozzles are formed with peripheral flanges around their respective arcuate walls, said detachable means fitting against said flanges.

3. The combination of claim 1 in which said tubes are provided on their peripheries with inter-engaging fastening means to secure said tubes in close proximity to each other.

4. The combination of claim 1 which further comprises means for detachably closing said upper end of at least one said tube.

5. The combination of claim 1 in which said nozzle securing means comprises for each said tube a spout having a flared upper portion located inside said tube and a lower spout portion, and detachable means for securing said lower spout portion to at least one said nozzle, said nozzles converging distally.

6. The combination of claim 1 in which at least one said dispensing aperture is semi-circular.

7. The combination of claim 6 in which the other said dispensing aperture is a shape other than semi-circular.

8. The combination of claim 7 in which said other dispensing aperture has a serrated arcuate edge.

9. The combination of claim 1 in which said lower spout portions are formed with external threads and said nozzles have external flanges on their upper ends, said detachable means comprising a nut engageable with said external threads and having an internal flange to engage said external flanges.

10. The combination of claim 9 in which the juxtaposed lower spout portions are externally threaded to form at least one continuous thread which is located on both spouts.

11. The combination of claim 10 which further comprises a second nut on said continuous thread positioned proximally of said first-mentioned nut formed with means to clamp the lower edge of both said tubes against the flared upper portions of their respective spouts.

12. The combination of claim 1 in which said flared portion has a flat side, the flat sides of both said spouts being parallel and proximate to each other.

13. The combination of claim 12 which further comprises means for locating the flat sides of said spouts in fixed location relative to each other.

14. The combination of claim 12 in which said flat sides extend between the upper ends of the flat walls of said first and second nozzles.

15. The combination of claim 14 in which said first and second nozzles are removable and which further comprises a third nozzle of round cross section shaped to receive the discharge of both said tubes simultaneously and formed with notches on its top edge to receive the lower portion of said flat walls.

* * * * *